United States Patent [19]
Thompson, Jr.

[11] 3,898,558
[45] Aug. 5, 1975

[54] DIRECT READING MICROWAVE REFRACTOMETER

[75] Inventor: Moody C. Thompson, Jr., Boulder, Colo.

[73] Assignee: The United States of America as represented by the Secretary of Commerce, Washington, D.C.

[22] Filed: July 30, 1974

[21] Appl. No.: 493,004

[52] U.S. Cl. .................... 324/58.5 C; 324/58.5 C
[51] Int. Cl.² ........................................ G01R 27/04
[58] Field of Search ...................... 324/58.5 C, 58 C

[56] References Cited
UNITED STATES PATENTS
2,457,673  12/1948  Hershberger ................ 324/58.5 C
2,972,105  2/1961   Ghose ...................... 324/58.5 C X Primary Examiner—Stanley T. Krawczewicz
Attorney, Agent, or Firm—David Robbins; Alvin J. Englert

[57] ABSTRACT

A microwave refractometer is disclosed which produces an output signal which varies as a linear function of the index of refraction of a microwave resonant sampling cavity. A voltage controlled oscillator having a variable oscillation frequency is electrically coupled to sampling cavity having a variable resonance frequency which is an inverse function of the index of refraction of the cavity. The resonant microwave electromagnetic signal present in the cavity is electrically coupled to a means which varies the oscillation frequency of the voltage controlled oscillator as a function of the resonant frequency and index of refraction of the sampling cavity. Means electrically coupled to an output signal of the voltage controlled oscillator produce an output signal which varies as a linear function of the index of refraction of the sampling cavity. In the preferred embodiment, this means comprises a crystal oscillator having a stable oscillation frequency and a circuit electrically coupled between the output of the voltage controlled oscillator and the crystal oscillator for gating and counting the number of cycles of the crystal oscillator which occur during a time interval which is a linear function of the index of refraction of the sampling cavity.

7 Claims, 1 Drawing Figure

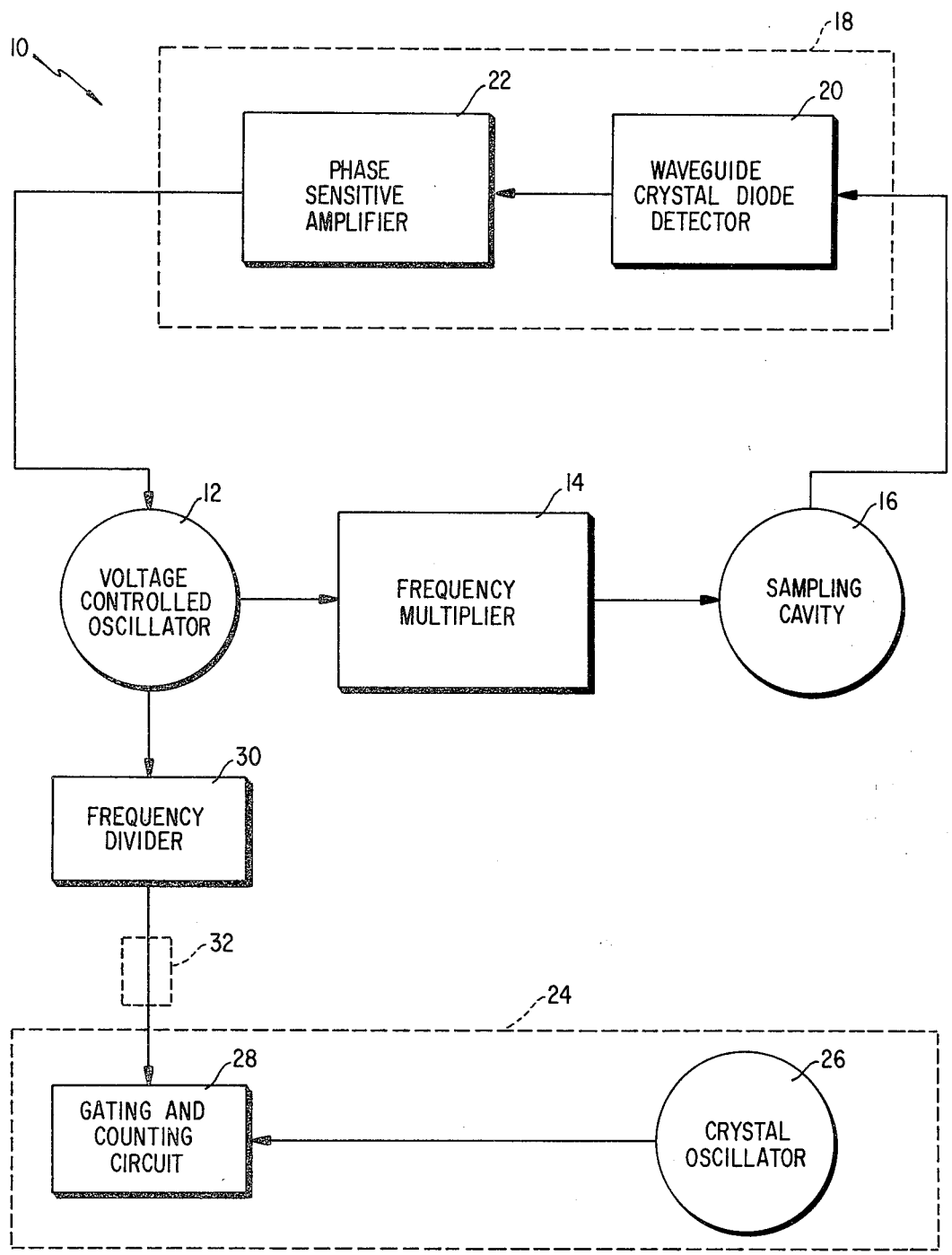

DIRECT READING MICROWAVE REFRACTOMETER

BACKGROUND OF THE INVENTION

1. Field of the Invention

The present invention relates to microwave refractometers of the type which produce an output signal which is a linear function of the index of refraction of a microwave resonant sampling cavity.

Microwave refractometers have been used extensively in atmospheric research where it was necessary to map precisely where variation in the index of refraction occurred in different levels of the atmosphere. These devices use a resonant microwave sampling cavity which may be filled with gaseous mixtures identical to those found in different layers of the atmosphere in which it is desired to map the index of refraction. As is well known, the resonant frequency of the chamber varies as an inverse function of index of refraction of the cavity. Accordingly, microwave refractometers measure indirectly the change in the index of refraction of the resonant microwave sampling cavity by measuring directly the change in the resonant frequency of the cavity.

2. Description of the Prior Art

An article entitled "Direct-Reading Microwave Refractometer With Quartz-Crystal Reference," authored by M. J. Vetter and Moody C. Thompson, Jr. and published in the *IEEE Transactions on Instrumentation and Measurement*, Vol. IM 20, No. 1, February, 1971, describes a microwave refractometer in which the center frequency of a voltage controlled oscillator tracks changes in the resonant frequency of the microwave resonant sampling cavity. Changes in the resonant frequency of the cavity are translated for direct reading by heterodyning the voltage controlled oscillator signal with the signal from a stable frequency crystal oscillator. A difference frequency is measured by a conventional frequency counter. However, this apparatus differs substantially from the present invention in that the output signal of the present invention is a linear function of the index of refraction of the sampling cavity while the output signal of the apparatus described in the aforementioned publication varies as an inverse function of the index of refraction of the sampling cavity.

SUMMARY OF THE INVENTION

The disadvantages and limitations of the prior art are solved by the present invention which comprises a direct reading microwave refractometer of the type which produces an output signal which varies as a linear function of the index of refraction of a microwave resonant sampling cavity. In a preferred embodiment, a voltage controlled oscillator is coupled to a frequency multiplier which drives a resonant microwave sampling cavity. A waveguide crystal diode detector, which is electrically coupled to a phase sensitive amplifier, translates changes in the resonant frequency of the sampling cavity into a control voltage which causes the oscillation frequency of the voltage controlled oscillator to track the changes in the resonant frequency of the sampling cavity.

The output signal of this embodiment is provided by counting the number of cycles of a stable frequency crystal oscillator which occur during a time interval which is a linear function of the index of refraction of the sampling cavity. A gating and counting circuit, which is electrically coupled to the output signal of the stable frequency crystal oscillator, is activated during one cycle of an output signal produced by a frequency divider which is electrically coupled to the output of the voltage controlled oscillator.

An important advantage of using the frequency divider to activate the gating and counting circuit is that the gating and counting circuit and the stable frequency crystal oscillator may be remotely located from the microwave frequency range components while electronically coupled thereto by a section of transmission line.

THEORETICAL DISCUSSION OF THE INVENTION

Given the following relationships which mathematically describe the operation of the present invention:

1. Count of the gating and counting circuit = gate time of the gating and counting circuit X crystal oscillator frequency ($f_r$);
2. Gate time = $p/f$ where $p$ is the division ratio of the frequency divider and $f$ is the resonant frequency of the voltage controlled oscillator;
3. $f_s$ (the resonant frequency of the sampling cavity) = $mf$ where $m$ is the integer multiplication factor of the miltiplier circuit; and
4. $f_s = k/n$ where $k$ is a constant and $n$ is the index of refraction of the resonant cavity.

It follows that:
5. Gate time = $mpn/k$ and
6. Count = $(mpn/k) f_r$.

In summary from inspection of relationship (6) it is readily seen that the count of the gating and counting circuit which is compiled during one cycle of the output signal produced by the dividing circuit, is a linear function of the index of refraction of the microwave resonant sampling cavity.

BRIEF DESCRIPTION OF THE DRAWING

FIG. 1 is a system schematic of the present invention.

DETAILED DESCRIPTION OF THE INVENTION:

At the outset before referring in detail to FIG. 1, it is to be understood that the individual circuits depicted therein as labeled geometric figures are well known to those skilled in the art and therefore their individual design and construction per se form no part of the present invention.

Referring to FIG. 1, a microwave refractometer 10 constructed according to the present invention has a voltage controlled oscillator 12 which is electrically coupled to sampling cavity 16 by means of frequency multiplier 14. The frequency multiplier 14 functions to multiply the variable oscillation frequency of oscillator 12 by an integer multiple to a microwave frequency which will sustain standing wave resonance within sampling cavity 16. The output signal from sampling cavity 16 is electrically coupled to a means 18 for varying the oscillation frequency of oscillator 12 as a function of the resonance frequency and thus the index of refraction of sampling cavity 16. The means 18 comprises a waveguide crystal diode detector 20 which is coupled to a phase sensitive amplifier 22. An output of oscillator 12 is coupled to a means 24 for producing an output signal which varies as a linear function of the index of refraction of sampling cavity 16. Means 24 comprises a stable frequency crystal oscillator 26 which is electrically coupled to a gating and counting circuit 28. Frequency divider 30 is disposed between oscillator 12 and means 24. The function of divider 30 is to divide the frequency of oscillator 12 by an integer to produce a signal which activates the gating and counting functions of circuit 28.

The activation occurs for a time equal to one cycle of the output signal of divider 30. During the activation period of gating and counting circuit 28, the number of signal cycles of crystal oscillator 26 are counted by gating and counting circuit 28 to compile a count having a magnitude which is a linear function of the index of refraction of sampling cavity 16.

An advantage of using frequency divider 30 is that the output signal may be coupled to gating and counting circuit 28 by means of a section of transmission line 32. Accordingly, circuit 24 may be located remotely from the remaining microwave frequency range components of the present invention.

While the present invention has been described in terms of a preferred embodiment, it is to be understood that numerous modifications may be made within the scope of the appended claims without departing from the spirit and scope of the invention. Accordingly, the appended claims are intended to cover the full range of equivalents of the present invention.

I claim as my Invention:

1. In a microwave refractometer of the type which produces an output signal which is a function of the index of refraction of a sampling cavity, the combination comprising:
    a. a first reference oscillator having a variable oscillation frequency;
    b. a sampling cavity electrically coupled to an output of said first reference oscillator, said sampling cavity having a variable resonant frequency which is an inverse function of the index of refraction of said sampling cavity;
    c. means electrically coupled between said sampling cavity and said first reference oscillator for varying the oscillation frequency of said first reference oscillator as a function of the resonant frequency and thus the index of refraction of said sampling cavity; and
    d. means electrically coupled to an output of said first reference oscillator for producing an output signal which varies as a linear function of the index of refraction of said sampling cavity.

2. In a microwave refractometer as recited in claim 1 wherein said means electrically coupled to an output of said reference oscillator for producing an output signal which varies as a linear function of the index of refraction comprises:
    a. a second reference oscillator producing an output signal having a stable oscillation frequency; and
    b. means electrically coupled to an output of said second reference oscillator for gating and counting the number of cycles of said second stable reference oscillator occurring during a time interval which is a linear function of the index of refraction of said sampling cavity.

3. In a microwave refractometer of the type recited in claim 2 further comprising:
    a. a frequency divider electrically coupled between the output of said first reference oscillator and said means for gating and counting for producing a signal which activates said means for gating and counting for the time interval which is equal to one cycle of the signal produced by said divider.

4. In a microwave refractometer of the type recited in claim 3 wherein said means electrically coupled between said sampling cavity and said first reference oscillator comprises:
    a. crystal waveguide diode detector electrically coupled to said sampling cavity for rectifying the resonant electromagnetic signal present in said sampling cavity; and
    b. a phase sensitive amplifier electrically coupled to an output of said crystal waveguide diode detector for producing an output voltage which varies as a function of the resonance frequency and index of refraction of said sample cavity, said output voltage being electrically coupled to said first reference oscillator for varying the oscillation frequency thereof.

5. In a microwave refractometer of the type recited in claim 4 further comprising:
    a. a frequency multiplier electrically coupled between said first reference oscillator and said sampling cavity, said frequency multiplier producing an output microwave signal which is an integer multiple of the oscillation frequency of said first reference oscillator.

6. In a microwave refractometer of the type recited in claim 3 wherein
    a. said frequency divider is located remotely from said means for gating and counting.

7. In a microwave refractometer of the type recited in claim 6 further comprising:
    a. a transmission line electrically coupling the output of said frequency divider to said means for gating and counting.

* * * * *